United States Patent [19]

Gauthier

[11] 4,225,491
[45] Sep. 30, 1980

[54] AZO PYRIDONE DYESTUFFS CONTAINING AT LEAST ONE REACTIVE PHOSPHORIC OR PHOSPHONIC ACID GROUP

[75] Inventor: Donald R. Gauthier, Somerset, Mass.

[73] Assignee: ICI United States, Inc., Wilmington, Del.

[21] Appl. No.: 832,374

[22] Filed: Sep. 12, 1977

[51] Int. Cl.$^2$ ............... C09B 29/36; C09B 62/82; D06P 1/384; D06P 3/66
[52] U.S. Cl. .................. 260/156; 260/205; 260/206; 260/502.5; 546/286; 546/296; 546/298; 546/300
[58] Field of Search ................ 260/156, 153

[56] References Cited

U.S. PATENT DOCUMENTS

| | | | |
|---|---|---|---|
| 3,926,944 | 12/1975 | Berrie et al. | 260/153 |
| 3,936,436 | 2/1976 | Berrie et al. | 260/153 |
| 3,956,273 | 5/1976 | Ruehler et al. | 260/146 R |
| 3,979,378 | 9/1976 | Gnad et al. | 260/156 |

FOREIGN PATENT DOCUMENTS

| | | | |
|---|---|---|---|
| 2004487 | 8/1971 | Fed. Rep. of Germany | 260/156 |
| 2324809 | 12/1973 | Fed. Rep. of Germany | 260/163 |

Primary Examiner—Floyd D. Higel
Attorney, Agent, or Firm—Cushman, Darby & Cushman

[57] ABSTRACT

Azo pyridone dyestuffs containing at least one reactive phosphoric or phosphonic acid group. The dyestuffs are characterized by the formula:

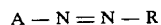

wherein A is an aromatic radical containing at least one phosphoric or phosphonic acid group and R is a monovalent radical derived from a pyridone coupling component by removing a hydrogen atom attached to a ring carbon atom of the pyridone ring. The aromatic radical A is preferably a phenyl or naphthyl group. In addition to its phosphonic or phosphoric acid group or groups, radical A may be substituted with one or more halogen, alkyl, alkoxy, nitro, sulfonic acid or carboxylic acid groups. Cellulosic textiles, e.g., cotton or cotton/polyester blends, may be reactively dyed with these dyestuffs in an acid, neutral or alkaline bath using dicyandiamide or the equivalent. The phosphoric or phosphonic acid groups and the cellulosic material react to fix the dye through an ester linkage.

Examples of suitable dyestuffs include those having the formula:

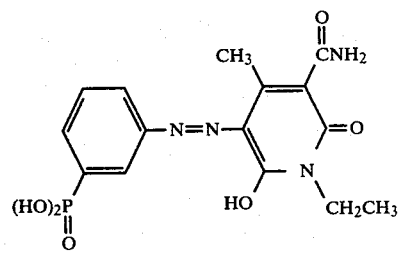

and

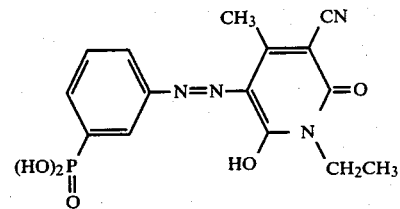

2 Claims, No Drawings

AZO PYRIDONE DYESTUFFS CONTAINING AT LEAST ONE REACTIVE PHOSPHORIC OR PHOSPHONIC ACID GROUP

BACKGROUND OF THE INVENTION

This invention relates to reactive pyridone dyestuffs which are suitable for dyeing cellulosic textile materials, such as cotton and cotton/polyester blends.

A process for reactively dyeing a hydroxy-substituted organic polymer, such as cellulose, is described by Stanford Research Institute in German Pat. No. 2,324,809, published Dec. 20, 1973. The process so described involves treating the cellulosic material with a dye containing a phosphonic acid group in the presence of a carbodiimide, e.g., dicyandiamide, in such a way that the dye is fixed to the cellulose in the form of a cellulose ester of phosphonic acid. The process can be illustrated by the following reaction:

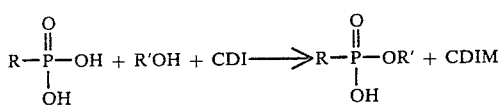

wherein R is a chromophore group, R'OH represents cellulose, CDI is the carbodiimide and CDIM is a residue or side product of carbodiimide. Cellulose materials so dyed exhibit good color stability when subsequently treated with alkaline detergents.

It is a primary object of the present invention to provide new fiber reactive dyestuffs which are especially suitable for coloring cellulose-based textile materials in the manner described in the above-mentioned German patent.

Still another object of this invention is to provide dyestuffs which may be employed in acid, neutral or alkaline baths to color cellulose materials.

These and other objects of the present invention will be apparent from the following description.

DESCRIPTION OF THE INVENTION

The azo pyridone dyestuffs of the invention may be illustrated by the formula:

$$A-N=N-R$$

wherein A is an aromatic radical containing at least one phosphoric or phosphonic acid group and R is a monovalent radical derived from a pyridone coupling component by removing a hydrogen atom attached to a ring carbon atom of the pyridone ring. The radical A forms the nucleus of an amine which, when diazotized and coupled with a pyridone coupling compound, yields the desired dyestuff of the formula noted.

The radical A is a phenylene or naphthalene nucleus containing at least one phosphoric or phosphonic acid group. The radical may be further substituted with halogen (e.g., chlorine, bromine or iodine, preferably chlorine), alkyl of 1 to 4 carbon atoms (preferably methyl), alkoxy of 1 to 4 carbons (preferably methoxy), cyano, nitro, or acetylamino. It is also contemplated that the dyestuffs of the present invention include those wherein A stands for a radical of azo benzene azonaphthalene or phenylazonaphthalene series which, if desired, may be substituted as noted.

In a preferred embodiment, A may be represented by the formulae:

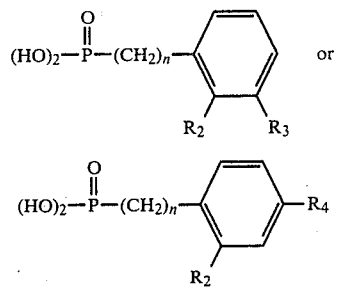

Wherein:
n is 0 or an integer from 1 to 4;
$R_2$ is hydrogen or halogen;
$R_3$ is hydrogen or nitro; and
$R_4$ is hydrogen, halogen, lower alkyl of 1 to 4 carbons, methyoxy, phenyoxy or R'—NH— where R' is alkyl of 1 to 4 carbon atoms, hydroxy alkyl of 1 to 4 carbon atoms having a terminal sulfonic acid group.

The pyridone radical R may be substituted or unsubstituted. When the pyridone ring is substituted, typical substituents include alkyl or alkoxy, e.g., lower alkyl or lower alkoxy of up to 6 carbon atoms, halogen, nitro, cyano, hydroxy, acetyl, carbamoyl, amino, carboxylic acid, sulfonic acid or the like. The substitution may be on any one or more of the ring carbons and/or on the ring nitrogen. Generally, the pyridone radical may be represented by the formula:

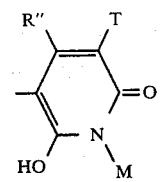

wherein:

M represents hydrogen, alkyl, arylalkyl, cycloalkyl, aryl or heterocyclic radical which may be substituted or a group of the formula $-SO_2NR^1R^2$ wherein $R^1$ and $R^2$ each independently represents a hydrogen atom, an alkyl, aralkyl, cycloalkyl, aryl or heterocyclic radical which may be substituted or the group $-NR^1R^2$ represents the radical of a 5 or 6 membered heterocyclic ring compound;

R" represents halogen, nitro, hydrogen, a CN, $COOR^1$, $CONR^1R^2$, $COR^1$ or OH group or an alkyl, arylalkyl, cycloalkyl, aryl or heterocyclic radical which may be substituted; and T represents a hydrogen atom a CN, $COOR^1$, $CONR^1R^2$ or $COR^1$ group or an alkyl, arylalkyl, cycloalkyl, aryl or heterocyclic radical which may be substituted.

In a preferred class of dyes, the pyridone radical may be represented by the formula:

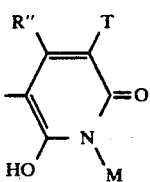

wherein:

M is hydrogen, alkyl of 1 to 4 carbons, or alkyl of 1 to 4 carbons substituted with a hydroxy, cyano, amino, chloro or alkoxy substituent;

R" is selected from hydrogen, alkyl of 1 to 4 carbons, carboxyl, alkoxy of 1 to 4 carbons, halogen or nitro; and T is alkyl of 1 to 4 carbon atoms, hydrogen, cyano and carbamoyl.

In a preferred class of dyes the pyridone radical R may be represented by the formula:

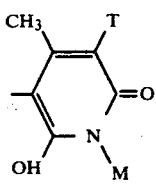

where T is carbamoyl, carboxyl or cyano and M is alkyl of 1 to 8 carbons, preferably ethyl.

Illustrative examples of pyridone 5-radicals for the dyestuffs of the present invention include the following compounds:

1,3-dimethyl-4-phenyl-6-hydroxypyrid-2-one;
1-ethyl-3-carbamoyl-4-phenyl-6-hydroxypyrid-2-one;
1-(β-butyl)-3-cyano-4-phenyl-6-hydroxypyrid-2-one;
1-(γ-methoxypropyl)-3-methyl-4-phenyl-6-hydroxypyrid-2-one;
1-(4-methylbenzyl)-3-ethyl-4-phenyl-6-hydroxypyrid-2-one;
1-(2',5'-dichlorophenyl)-3-carbamoyl-4-phenyl-6-hydroxypyrid-2-one;
1-ethyl-3-cyano-4-(4'-methoxyphenyl)-6-hydroxypyrid-2-one;
1-(n-propyl)-3-carbamoyl-4-(4'-methoxyphenyl)-6-hydroxypyrid-2-one;
1-ethyl-3-cyano-4-(3'-sulpho-4'-methoxyphenyl)-6-hydroxypyrid-2-one;
1-ethyl-3-cyano-4-sulphomethyl-6-hydroxypyrid-2-one;
1-(n-butyl)-3-methyl-4-chloromethyl-6-hydroxypyrid-2-one;
1-(4-methylbenzyl)-3-cyano-4-ethyl-6-hydroxypyrid-2-one;
1-(4-methylbenzyl)-3-carbamoyl-4-n-propyl-6-hydroxypyrid-2-one;
1-(4-methylbenzyl)-3-ethyl-4-n-butyl-6-hydroxypyrid-2-one;
1-(4-nitrobenzyl)-3-cyano-4-sulphomethyl-6-hydroxypyrid-2-one;
1-(4-nitrobenzyl)-3-methoxycarbonyl-4-ethyl-6-hydroxypyrid-2-one;
1-(4-nitrobenzyl)-3-ethoxycarbonyl-4-phenyl-6-hydroxypyrid-2-one;
1-(β-phenylethyl)-3-cyano-4-carboxy-6-hydroxypyrid-2-one;
1-(β-phenylethyl)-3-carbamoyl-4-amino-6-hydroxypyrid-2-one;
1-(β-phenylethyl)-3-ethyl-4-acetylamino-6-hydroxypyrid-2-one;
1-phenyl-3-cyano-(4'-chlorophenyl)-6-hydroxypyrid-2-one;
1-ethyl-3-cyano-4-(3'-nitrophenyl)-6-hydroxypyrid-2-one; and
1-ethyl-4-hydroxy-6-methylpyrid-2-one.

It is particularly preferred to have R as the 5-radical of:

4-methyl-6-hydroxypyrid-2-ones, for example;
4-methyl-2,6-dihydroxy pyridine;
1,4-dimethyl-6-hydroxypyrid-2-one;
1,4-dimethyl-3-cyano-6-hydroxypyrid-2-one;
1,4-dimethyl-3-carbamoyl-6-hydroxypyrid-2-one;
1-ethyl-4-methyl-6-hydroxypyrid-2-one;
1-ethyl-3-cyano-4-methyl-6-hydroxypyrid-2-one;
1-ethyl-3-carbamoyl-4-methyl-6-hydroxypyrid-2-one;
1-ethyl-3,4-dimethyl-6-hydroxypyrid-2-one;
1,3-diethyl-4-methyl-6-hydroxypyrid-2-one;
1-(n-butyl)-3-cyano-4-methyl-6-hydroxypyrid-2-one;
1-(n-butyl)-3-carbamoyl-4-methyl-6-hydroxypyrid-2-one;
1-(n-butyl)-3,4-dimethyl-6-hydroxypyrid-2-one;
1-(n-butyl)-3-ethyl-4-methyl-6-hydroxypyrid-2-one;
1-(β-hydroxyethyl)-3-cyano-4-methyl-6-hydroxypyrid-2-one;
1-(β-hydroxyethyl)-3-carbamoyl-4-methyl-6-hydroxypyrid-2-one;
1-(β-hydroxyethyl)-3,4-dimethyl-6-hydroxypyrid-2-one;
1-(β-hydroxyethyl)-3-ethyl-4-methyl-6-hydroxypyrid-2-one;
1-(β-cyanoethyl)-3-cyano-4-methyl-6-hydroxypyrid-2-one,
1-(β-cyanoethyl)-3-carbamoyl-4-methyl-6-hydroxypyrid-2-one;
1-(β-cyanoethyl)-3,4-dimethyl-6-hydroxypyrid-2-one;
1-(β-cyanoethyl)-3-ethyl-4-methyl-6-hydroxypyrid-2-one;
1-(γ-methoxypropyl)-3-cyano-4-methyl-6-hydroxypyrid-2-one;
1-(γ-methoxypropyl)-3-carbamoyl-4-methyl-6-hydroxypyrid-2-one;
1-(γ-methoxypropyl)-3,4-dimethyl-6-hydroxypyrid-2-one;
1-(γ-methoxypropyl)-3-ethyl-4-methyl-6-hydroxypyrid-2-one;
1-(2-ethylhexyl)-3-cyano-4-methyl-6-hydroxypyrid-2-one;
1-(2-ethylhexyl)-3-carbamoyl-4-methyl-6-hydroxypyrid-2-one;
1-(2-ethylhexyl)-3,4-dimethyl-6-hydroxypyrid-2-one;
1-(2-ethylhexyl)-3-ethyl-4-methyl-6-hydroxypyrid-2-one;
1-(1-n-octyl)-3-cyano-4-methyl-6-hydroxypyrid-2-one;
1-(1-n-octyl)-3-carbamoyl-4-methyl-6-hydroxypyrid-2-one;
1-(1-n-octyl)-3,4-dimethyl-6-hydroxypyrid-2-one;
1-(1-n-octyl)-3-ethyl-4-methyl-6-hydroxypyrid-2-one;
1-(1-n-dodecyl)-3-cyano-4-methyl-6-hydroxypyrid-2-one;
1-(1-n-dodecyl)-3-carbamoyl-4-methyl-6-hydroxypyrid-2-one;
1-(1-n-dodecyl)-3,4-dimethyl-6-hydroxypyrid-2-one;

1-(1-n-dodecyl)-3-ethyl-4-methyl-6-hydroxypyrid-2-one;
1-(2-ethylhexyl)-4-methyl-6-hydroxypyrid-2-one;
1-benzyl-3-cyano-4-methyl-6-hydroxypyrid-2-one;
1-benzyl-3-carbamoyl-4-methyl-6-hydroxypyrid-2-one;
1-benzyl-3,4-dimethyl-6-hydroxypyrid-2-one;
1-benzyl-3-ethyl-4-methyl-6-hydroxypyrid-2-one;
1-(4-methylbenzyl)-3-cyano-4-methyl-6-hydroxypyrid-2-one;
1-(4-methylbenzyl)-3-carbamoyl-4-methyl-6-hydroxypyrid-2-one;
1-(4-methylbenzyl)-3,4-dimethyl-6-hydroxypyrid-2-one;
1-(4-methylbenzyl)-3-ethyl-4-methyl-6-hydroxypyrid-2-one;
1-(4-nitrobenzyl)-3-cyano-4-methyl-6-hydroxypyrid-2-one;
1-(4-nitrobenzyl)-3-carbamoyl-4-methyl-6-hydroxypyrid-2-one;
1-(4-nitrobenzyl)-3,4-dimethyl-6-hydroxypyrid-2-one;
1-(4-nitrobenzyl)-3-ethyl-4-methyl-6-hydroxypyrid-2-one;
1-($\beta$-phenylethyl)-3-cyano-4-methyl-6-hydroxypyrid-2-one;
1-($\beta$-phenylethyl)-3-carbamoyl-4-methyl-6-hydroxypyrid-2-one;
1-($\beta$-phenylethyl)-3,4-dimethyl-6-hydroxypyrid-2-one;
1-($\beta$-phenylethyl)-3-ethyl-4-methyl-6-hydroxypyrid-2-one;
1-phenyl-3-cyano-4-methyl-6-hydroxypyrid-2-one;
1-phenyl-3-carbamoyl-4-methyl-6-hydroxypyrid-2-one;
1-phenyl-3,4-dimethyl-6-hydroxypyrid-2-one;
1-phenyl-3-ethyl-4-methyl-6-hydroxypyrid-2-one;
1-(o- or m- or p-chlorophenyl)-3-cyano-4-methyl-6-hydroxypyrid-2-one;
1-(o- or m- or p-chlorophenyl)-3-carbamoyl-4-methyl-6-hydroxypyrid-2-one;
1-(o- or m- or p-chlorophenyl)-3,4-dimethyl-6-hydroxypyrid-2-one;
1-(o- or m- or p-chlorophenyl)-3-ethyl-4-methyl-6-hydroxypyrid-2-one;
1-(2',4'-dichlorophenyl)-3-cyano-4-methyl-6-hydroxypyrid-2-one;
1-(2',4'-dichlorophenyl)-3-carbamoyl-4-methyl-6-hydroxypyrid-2-one;
1-(2',4'-dichlorophenyl)-3,4-dimethyl-6-hydroxypyrid-2-one;
1-(2',4'-dichlorophenyl)-3-ethyl-4-methyl-6-hydroxypyrid-2-one;
1-(2',5'-dichlorophenyl)-3-cyano-4-methyl-6-hydroxypyrid-2-one;
1-(2',5'-dichlorophenyl)-3-carbamoyl-4-methyl-6-hydroxypyrid-2-one;
1-(2',5'-dichlorophenyl)-3,4-dimethyl-6-hydroxypyrid-2-one;
1-(2',5'-dichlorophenyl)-3-ethyl-4-methyl-6-hydroxypyrid-2-one;
1-(o- or m- or p-tolyl)-3-cyano-4-methyl-6-hydroxypyrid-2-one;
1-(o- or m- or p-tolyl)-3-carbamoyl-4-methyl-6-hydroxypyrid-2-one;
1-(o- or m- or p-tolyl)-3,4-dimethyl-6-hydroxypyrid-2-one;
1-(o- or m- or p-tolyl)-3-ethyl-4-methyl-6-hydroxypyrid-2-one;
1-(o- or m- or p-anisoyl)-3-cyano-4-methyl-6-hydroxypyrid-2-one;
1-(o- or m- or p-anisoyl)-3-carbamoyl-4-methyl-6-hydroxypyrid-2-one;
1-(o- or m- or p-anisoyl)-3,4-dimethyl-6-hydroxypyrid-2-one;
1-(o- or m- or p-anisoyl)-3-ethyl-4-methyl-6-hydroxypyrid-2-one;
1-(2'-methoxy-5'-methylphenyl)-3-cyano-4-methyl-6-hydroxypyrid-2-one;
1-(2'-methoxy-5'-methylphenyl)-3-carbamoyl-4-methyl-6-hydroxypyrid-2-one;
1-(2'-methoxy-5'-methylphenyl)-3,4-dimethyl-6-hydroxypyrid-2-one;
1-(2'-methoxy-5'-methylphenyl)-3-ethyl-4-methyl-6-hydroxypyrid-2-one;
1-(2',4'-dimethylphenyl)-3-cyano-4-methyl-6-hydroxypyrid-2-one;
1-(2',4'-dimethylphenyl)-3-carbamoyl-4-methyl-6-hydroxypyrid-2-one;
1-(2',4'-dimethylphenyl)-3,4-dimethyl-6-hydroxypyrid-2-one;
1-(2',4'-dimethylphenyl)-3-ethyl-4-methyl-6-hydroxypyrid-2-one;
1-(2',5'-dimethoxyphenyl)-3-cyano-4-methyl-6-hydroxypyrid-2-one;
1-(2',5'-dimethoxyphenyl)-3-carbamoyl-4-methyl-6-hydroxypyrid-2-one;
1-(2',5'-dimethoxyphenyl)-3,4-dimethyl-6-hydroxypyrid-2-one;
1-(2',5'-dimethoxyphenyl)-3-ethyl-4-methyl-6-hydroxypyrid-2-one;
1-(4'-chloro-2',5'-dimethoxyphenyl)-3-cyano-4-methyl-6-hydroxypyrid-2-one;
1-(4'-chloro-2',5'-dimethylphenyl)-3-carbamoyl-4-methyl-6-hydroxypyrid-2-one;
1-(4'-chloro-2',5'-dimethoxyphenyl)-3,4-dimethyl-6-hydroxypyrid-2-one;
1-(4'-chloro-2',5'-dimethylphenyl)-3-ethyl-4-methyl-6-hydroxypyrid-2-one;
1-(3'-nitrophenyl)-3-cyano-4-methyl-6-hydroxypyrid-2-one;
1-(3'-nitrophenyl)-3-carbamoyl-4-methyl-6-hydroxypyrid-2-one;
1-(3'-nitrophenyl)-3,4-dimethyl-6-hydroxypyrid-2-one;
1-(3'-nitrophenyl)-3-ethyl-4-methyl-6-hydroxypyrid-2-one;
1-(4'-carbamoylphenyl)-3-cyano-4-methyl-6-hydroxypyrid-2-one;
1-(4'-carbamoylphenyl)-3-carbamoyl-4-methyl-6-hydroxypyrid-2-one;
1-(4'-carbamoylphenyl)-3,4-dimethyl-6-hydroxypyrid-2-one;
1-(4'-carbamoylphenyl)-3-ethyl-4-methyl-6-hydroxypyrid-2-one;
1-(4'-[N-phenylcarbamoyl]phenyl)-3-carbamoyl-4-methyl-6-hydroxypyrid-2-one;
1-(4'-[N-phenylcarbamoyl]phenyl)-3-carbamoyl-4-methyl-6-hydroxypyrid-2-one;
1-(4'-[N-phenylcarbamoyl]phenyl)-3,4-dimethyl-6-hydroxypyrid-2-one;
1-(4'-[N-phenylcarbamoyl]phenyl)-3-ethyl-4-methyl-6-hydroxypyrid-2-one;
1-($\alpha$-naphthyl)-3-cyano-4-methyl-6-hydroxypyrid-2-one;

1-(α-naphthyl)-3-carbamoyl-4-methyl-6-hydroxypyrid-2-one;
1-(α-naphthyl)-3,4-dimethyl-6-hydroxypyrid-2-one;
1-(α-naphthyl)-3-ethyl-4-methyl-6-hydroxypyrid-2-one;
1-ethyl-4-methyl-6-hydroxypyrid-2-one;
1-ethyl-3-n-propyl-4-methyl-6-hydroxypyrid-2-one;
1-ethyl-3-n-butyl-4-methyl-6-hydroxypyrid-2-one;
1-(β-chloroethyl)-3,4-dimethyl-6-hydroxypyrid-2-one;
1-(n-butyl)-3-isopropyl-4-methyl-6-hydroxypyrid-2-one;
1-(β-N-methylaminoethyl)-3,4-dimethyl-6-hydroxypyrid-2-one;
1-(β-hydroxyethyl)-3-chloromethyl-4-methyl-6-hydroxypyrid-2-one;
1-(β-N,N-dimethylaminoethyl)-3,4-dimethyl-6-hydroxypyrid-2-one;
1-(β-hydroxyethyl)-3-nitro-4-methyl-6-hydroxypyrid-2-one;
1-(β-cyanoethyl)-3-amino-4-methyl-6-hydroxypyrid-2-one;
1-(β-cyanoethyl)-3-methoxy-4-methyl-6-hydroxypyrid-2-one;
1-(β-aminoethyl)-3,4-dimethyl-6-hydroxypyrid-2-one;
1-(β-cyanoethyl)-3-ethoxy-4-methyl-6-hydroxypyrid-2-one;
1-(γ-methoxypropyl)-3-isopropoxy-4-methyl-6-hydroxypyrid-2-one;
1-(γ-methoxypropyl)-3-butoxy-4-methyl-6-hydroxypyrid-2-one;
1-(β-acetylaminoethyl)-3,4-dimethyl-6-hydroxypyrid-2-one;
1-(γ-methoxypropyl)-3-acetylamino-4-methyl-6-hydroxypyrid-2-one;
1-(2-ethylhexyl)-3-benzoylamino-4-methyl-6-hydroxypyrid-2-one;
1-(2-ethylhexyl)-3-benzyl-4-methyl-6-hydroxypyrid-2-one;
1-(β-N-methylacetylaminoethyl)-3,4-dimethyl-6-hydroxypyrid-2-one;
1-(4'-aminophenyl)-3,4-dimethyl-6-hydroxypyrid-2-one;
1-(1-n-dodecyl)-3-ethylsulphonylmethyl-4-methyl-6-hydroxypyrid-2-one;
1-(1-n-dodecyl)-3-N-methylcarbamoyl-4-methyl-6-hydroxypyrid-2-one;
1-(4'-acetylaminophenyl)-3,4-dimethyl-6-hydroxypyrid-2-one;
1-(1-n-dodecyl)-3-N-ethylcarbamoyl-4-methyl-6-hydroxypyrid-2-one;
1-(2-ethylhexyl)-4-methyl-6-hydroxypyrid-2-one;
1-benzyl-3-N,N-dimethylcarbamoyl-4-methyl-6-hydroxpyrid-2-one;
1-benzyl-3-N,N-diethylcarbamoyl-4-methyl-6-hydroxypyrid-2-one;
1-(3'-sulphophenyl)-3,4-dimethyl-6-hydroxypyrid-2-one;
1-phenyl-3-methoxycarbaonyl)-4-methyl-6-hydroxypyrid-2-one; and
1-phenyl-3-ethoxycarbonyl-4-methyl-6-hydroxypyrid-2-one.

The dyestuffs of the invention may be prepared by coupling a diazonium salt of an aromatic phosphonic acid with a pyridone chromophore coupling component having a removable hydrogen atom on a ring carbon. The diazonium salt of the aromatic phosphonic acid can be prepared in a known manner (see for example, Vogel "Practical Organic Chemistry" (1951) or German Pat. No. 2,324,809) from the corresponding aromatic primary amine containing one or more phosphonic acid groups. Thus, for example, the diazonium chloride salt may be made by reacting the amine with sodium nitrite in the presence of HCl at low temperature (0°–15° C.).

The diazotized product is then coupled, also in conventional fashion, with the pyridone coupling component (see again Vogel "Practical Organic Chemistry" and German Pat. No. 2,324,809, both mentioned above). Thus, for example, an aqueous solution of the diazotized component at a temperature of about 0°–5° C. may be mixed with an alkaline aqueous solution of the pyridone coupling component at about 15°–25° C. followed by precipitation of the desired dyestuff.

The new dyes can be isolated as solid products by conventional means such as by precipitation and filtration. They are preferably isolated in the acid form or in the form of an ammonium salt. They may also be isolated in one of these forms and partly as an alkali metal, e.g. Li, Na or K salt. These salts can be obtained by adding a halide e.g. the chloride of the desired alkali metal or ammonium halide or ammonia to the completed reaction mixture before isolation. Alternatively by addition of an alkanolamine e.g. diethanolamine to the completed reaction mixture, a highly soluble form of the dyestuff is obtained which can be used as a total liquor for the dyeing in printing processes.

Aromatic primary amines containing a phosphonic acid group which may be converted to diazonium salts for use in preparing the dyestuffs of the invention may be described by the following formula:

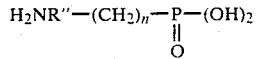

wherein R'' is an aromatic radical, preferably a phenyl or naphthyl radical, unsubstituted or substituted, and n is 0 or a whole number from 1 to 4, preferably 0.

Typical examples of phosphonic acid amines which can be diazotized for use herein include the following:
meta-aminophenyl phosphonic acid;
para-aminophenyl phosphonic acid;
meta-aminobenzyl phosphonic acid;
para-aminobenzyl phosphonic acid;
2,4,6-tribromo-5-aminophenyl phosphonic acid;
3-nitro-4-aminophenyl phosphonic acid;
3-amino-4-chlorophenyl phosphonic acid;
3-amino-4-methylphenyl phosphonic acid;
3-amino-4-phenoxyphenyl phosphonic acid;
3-amino-4-hydroxyphenyl phosphonic acid;
3-amino-4-orthochlorophenoxyphenyl phosphonic acid;
3-amino-4-bromophenyl phosphonic acid;
3-amino-4-methoxyphenyl phosphonic acid;
3-amino-4-methylphenyl phosphonic acid;
2-hydroxy-5-aminobenzyl phosphonic acid;
4-amino-1-naphthyl phosphonic acid;
4-amino-8-methyl-1-naphthyl phosphonic acid; and
4-amino-3-chloro-1-naphthyl phosphonic acid.

If desired, any of the above amines may be coupled with such amines as p-xylidine, Peri acid, cresidine; also, one may use either aniline or meta-toluidine by way of the methane sulfonic acids. The resulting aminomonazo compounds may then be diazotized and coupled with the desired pyridone coupling component. Thus, suitable amino-monazo compounds include:

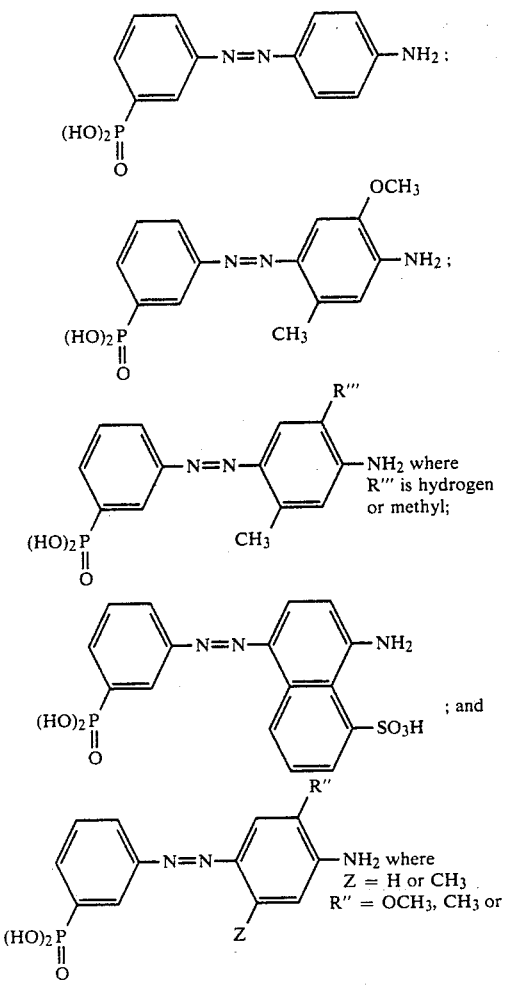

The new dyestuffs are soluble in water owing to the presence of phosphoric or phosphonic acid groups. In many cases, there may also be sulfonic acid groups present to increase their solubility. They can be used, in general, for the coloration of textile materials which can be dyed by dyes solubilized by anionic groups, e.g., natural and synthetic polyamide materials, e.g., wool, silk, polyhexamethylene adipamide and polycaproimide, but more especially, natural or regenerated cellulose textile materials, e.g., cotton, linen and viscose rayon; in the case of cellulose textile materials, they are preferably fixed on the fiber by baking at a temperature of from 95°–205° C. in the presence of a carbodiimide, e.g., cyanamide, dicyandiamide, as described in German Pat. No. 2,324,809.

The new dyestuffs are particularly suitable for application to mixed fabrics of cellulose and synthetics, e.g., polyester materials, together with disperse dyes from a single dyebath or printing paste. In this respect, the new dyestuffs show an advantage over most conventional reaction dyes which are normally applied in the presence of alkaline fixing agents. The latter lead to flocculation of the majority of disperse dyes, so that the range of the latter which can be applied together with conventional reactive dyes in single dyestuffs or printing pastes is very limited. In contrast, the acid fixing conditions used for the new dyes have no effect on disperse dyes, and the two classes of dyes can be used together without difficulty.

The invention is illustrated, but not limited by, the following examples wherein parts are by weight unless otherwise stated.

EXAMPLE 1

0.3 moles of the diazonium salt (chloride) of 3-aminobenzene phosphonic acid were mixed with 0.3 moles N-ethyl-2-hydroxy-4-methyl-3-carbamoylpyridone of the formula:

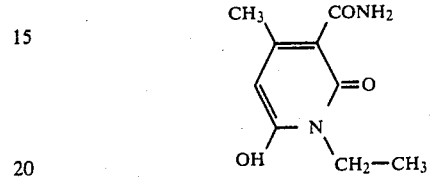

in 1500 ml. of water at a temperature of between 0°–5° C. and a pH of 7–8. Coupling occurred and the reaction product precipitated. The reaction mixture was thereafter diluted to 3000 ml and heated to 80° C. in order to dissolve the precipitate. The solution was then cooled to 50° C. and salted with 10% w/v ammonium chloride. The salted solution was then cooled to 25° C. and filtered, yielding 77.1% of a reactive yellow diazo dyestuff product having the formula:

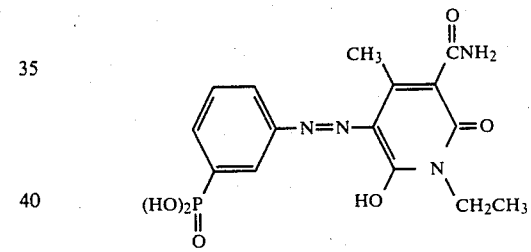

EXAMPLE 2

0.3 mole of the diazonium chloride of 3-amino-benzene phosphonic acid was coupled with 0.3 mole of N-ethyl-2-hydroxy-4-methyl-5-cyano-pyridone in 1500 ml of water having a pH of 8.5 at a temperature of 0°–5° C. After coupling, a very thick slurry was observed, and the coupling mass was diluted to 3000 ml with heating to 80° C. The solution was then cooled to 50° C. and salted 5% w/v with ammonium chloride. Additional salting of 5% w/v at 20° C. was necessary and the product then filtered at a pH of 8.0. The resulting reactive yellow dyestuff was obtained in a yield of about 53.1% and had a formula:

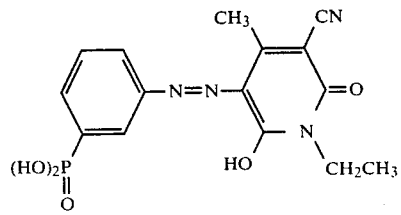

In the table below are further examples of reactive dyestuffs according to the present invention and the colors produced therewith.

TABLE

| Example | Dyestuff Formula | Shade |
|---|---|---|
| 3 | 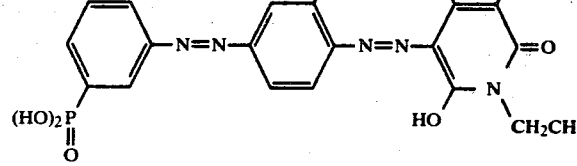 | bluish-red |
| 4 | 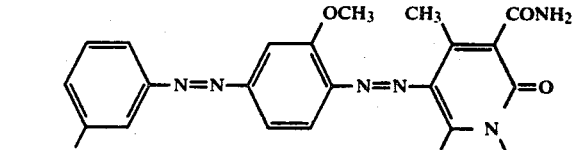 | bluish-red |
| 5 | 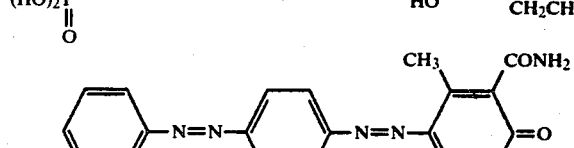 | bluish-red |
| 6 | 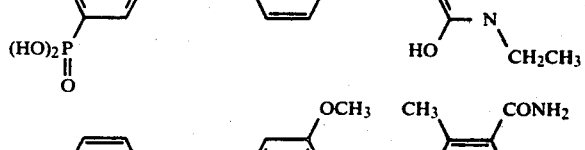 | bluish-red |

EXAMPLE 7

By omitting the addition of ammonium chloride in the procedure of Example 1 and replacing it by step of adding hydrochloric acid until the pH of the reaction is 0.5 the dyestuffs described in any of the precedingExamples may be obtained in their free acid form.

EXAMPLE 8

By using diethanolamine in the procedure of Example 1; and omitting the addition of ammonium chloride a solution of the diethanolamine salt of the dyestuffs of any of the Examples 1-6 may be obtained. This solution may be used to prepare the dye liquor for dyeing by the process of OLS 2,324,809.

It will be appreciated that various modifications may be made in the invention described herein. Hence, the scope of the invention is defined in the following claims wherein:

I claim:

1. An azo dyestuff having the formula:

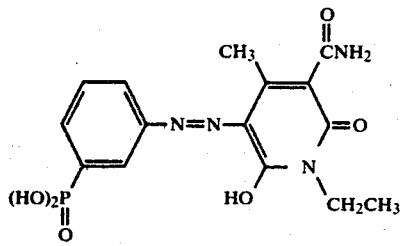

2. An azo dyestuff having the formula:

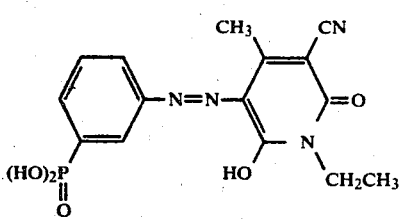

* * * * *